United States Patent
Abbotts

[15] 3,648,512
[45] Mar. 14, 1972

[54] METHODS AND APPARATUS FOR MEASURING THE DENSITIES OF FLUIDS

[72] Inventor: William Edward Abbotts, Farnborough, England

[73] Assignee: The Solartron Electronic Group Limited, Farnborough, Hampshire, England

[22] Filed: Jan. 28, 1970

[21] Appl. No.: 888,103

Related U.S. Application Data

[62] Division of Ser. No. 611,632, Jan. 25, 1967, Pat. No. 3,516,283.

[30] Foreign Application Priority Data

Jan. 28, 1966 Great Britain............... 4,042/66

[52] U.S. Cl. ................................. 73/32, 73/30, 73/67.2
[51] Int. Cl. .................................................. G01n 9/00
[58] Field of Search.............. 73/30, 32, 59, 54, 71.5, 67, 73/67.1, 67.2, 67.3; 310/9.6, 9.7

[56] References Cited

UNITED STATES PATENTS

| 3,021,711 | 2/1962 | Aruidion................... 73/32 X |
| 2,340,992 | 2/1944 | Siegel........................ 73/59 |
| 3,164,987 | 1/1965 | Davidson et al. ......... 73/67.2 X |
| 3,225,588 | 12/1965 | Moulin et al................ 73/32 |

OTHER PUBLICATIONS

Harris " Shock & Vibration Handbook" Vol. 1 pp. 12– 14, 15 1962
Carlin " Ultrasonics" pp. 49– 50 1961
Santen " Mechanical Vibration" 1958, pp. 240– 243

Primary Examiner—Richard C. Queisser
Assistant Examiner—Ellis J. Koch
Attorney—William R. Sherman, Stewart F. Moore and Jerry M. Presson

[57] ABSTRACT

A density meter for measuring the density of a gas, having a hollow cylinder which is set into bell-like vibration when the gas is in contact with the cylinder both internally and externally to avoid differential pressure, or the cylinder walls are so thick that a gas or liquid can be applied to an internal or external surface alone, in each case the predominant frequency being measured.

3 Claims, 4 Drawing Figures

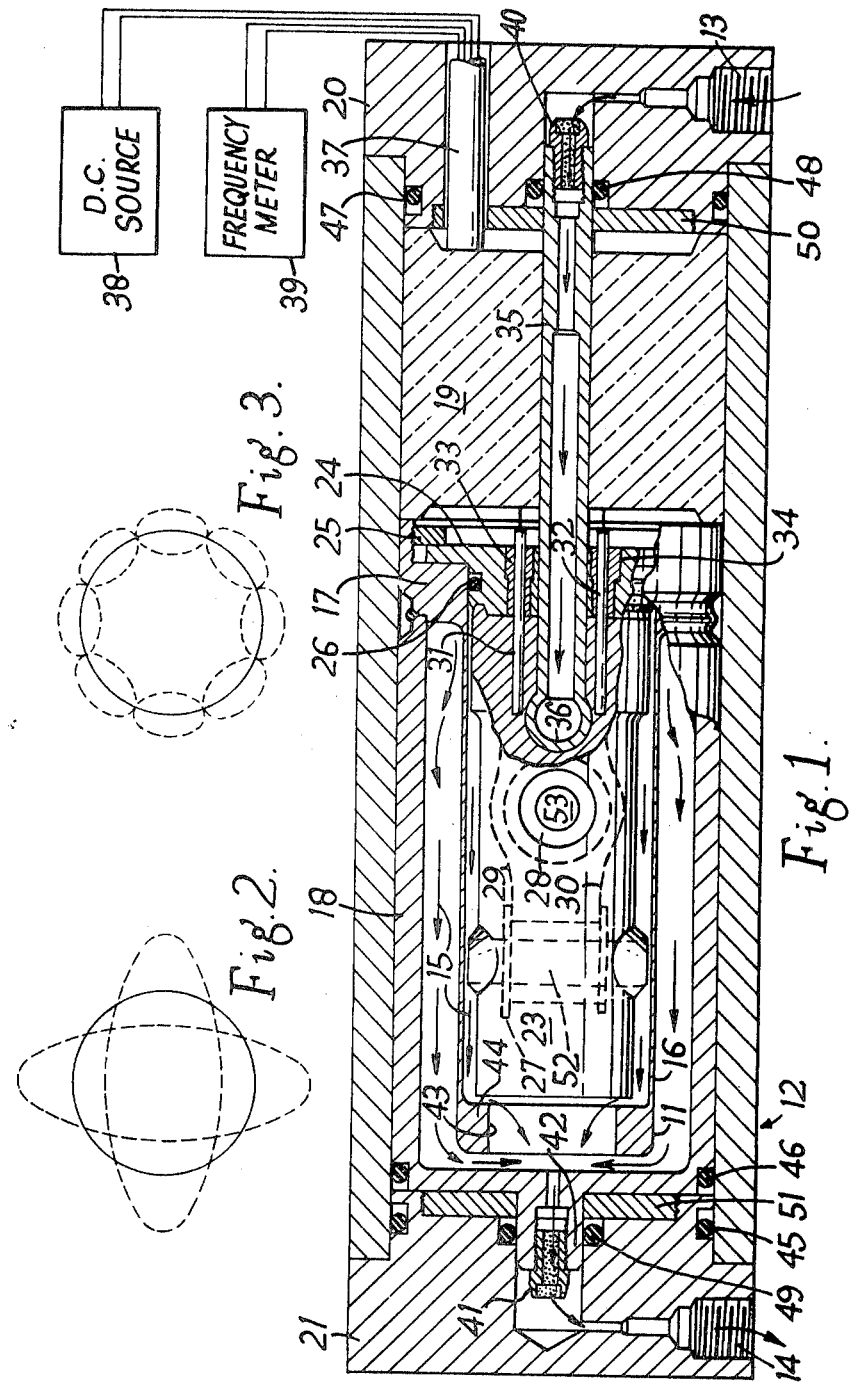

METHODS AND APPARATUS FOR MEASURING THE DENSITIES OF FLUIDS

This application is a division of application Ser. No. 611,632 filed Jan. 25, 1967 now U.S. Pat. No. 3,516,283.

This invention relates to methods of measuring the densities of fluids and apparatus therefor.

It has been found that the frequencies of the natural bell-like vibrations excited when a hollow body of resilient material is, for example, struck vary with the density of a fluid which is in contact with a predetermined region of the hollow body. The predominant frequency of such vibrations, that is, the frequency of the vibrations containing most energy, is thus related to the density of such a fluid.

According to the present invention a method of measuring the density of a fluid comprises the steps of bringing the fluid into contact with a predetermined region of a hollow body formed of resilient material, exciting natural vibrations of the body, rendering a frequency of the vibrations substantially insensitive to variations in differential pressure exerted on the predetermined region at least within a given range of pressure and measuring the said frequency.

Also according to the present invention a density meter for measuring the density of a fluid includes a hollow body of resilient material, means for exciting natural vibrations of the hollow body, and means for generating a signal representative of a frequency the said vibrations, the hollow body being such as to permit the application of the fluid to at least part of a wall thereof, the wall being of such thickness that the said frequency is substantially insensitive to variations in differential pressure exerted thereon within a given range of pressure.

Further according to the present invention, a density meter for measuring the density of a fluid includes a hollow body of resilient material, means for exciting natural vibrations of the hollow body, and scans for generating a signal representative of a frequency of the said vibrations, the hollow body being such as to permit application of the fluid to external and internal surfaces of the hollow body at equal pressures.

The invention will now be further described by way of example with reference to the accompanying drawings in which:

FIG. 1 shows partially in section a first embodiment of the invention;

FIG. 2 illustrates natural bell-like vibrations of the hollow body of the first embodiment;

FIG. 3 illustrates further natural bell-like vibrations of the hollow body of the first embodiment;

Figure 4:
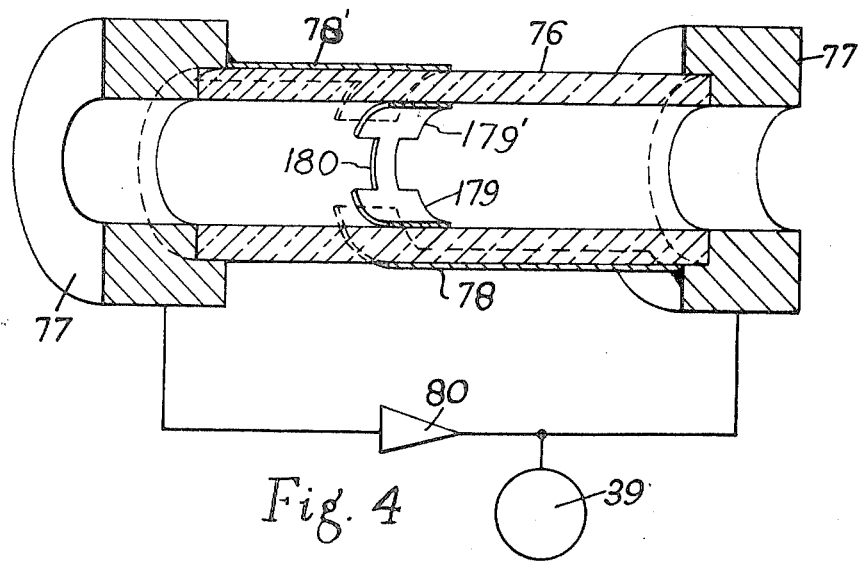
FIG. 4 is a simplified view, partially sectional, of a fifth embodiment of the invention.

Referring to FIG. 1, there is shown a density meter for measuring the density of a gas. A cylindrical tube 11 formed of ferromagnetic metal, such as Ni-Span-C/902 (trade mark), is secured within a chamber 12 having an inlet port 13 and an outlet port 14. The directions of flow of the gas in operation are indicated by arrows as, for example, at 15. The cylindrical wall 16 of the tube 11 is integral with a flange 17 which fits slidingly within the chamber 12. The flange 17 is located between a chamber-lining member 18, to which the flange 17 is welded, and an amplifier 19. The chamber-lining member 18 and the amplifier 19 also fit slidingly within the chamber 12. The ends of the chamber 12 are formed by tightly fitted end members 20 and 21.

A cylindrical supporting body 23 of thermoset synthetic resin bonded to a metal end plate 24 is located coaxially within the tube 11, a flange on the end plate 24 being held against the flange 17 by a retaining ring 25 screw-threadedly engaged in a skirt formed on the flange 17. An O-ring 26 provides a gastight seal between the end plate 24 and the inner surface of the tube 11.

A drive coil 27 and a pickup coil 28 are so embedded in the body 23 that their axes are mutually perpendicular and are respectively perpendicular to the longitudinal axis of the tube 11. The body 23, the drive coil 27 and the pickup coil 28 are arranged to be clear of the walls of the tube 11 in order that the tube may vibrate without striking the body 23 and the coils 27 and 28. Leads 29 and 30 from the output circuit of the amplifier 19 enter the body 23 through a conduit 31, leads (not shown) from the pickup coil 28 to the amplifier 19 leave the body 23 through a further conduit 32. The conduits 31 and 32 are located in insulating bushes 33 and 34 in the end plate 24.

A metal pipe 35 extends from the end closure member 20, through the amplifier 19 and the end plate 24, and into the body 23 where a further pipe 36 is secured in communication therewith. The further metal pipe 36 lies with its axis parallel to the axis of the pickup coil 28 and its ends are open so that gas from the pipe 35 can flow into the space between the body 23 and the tube 11.

Small circular holes (not shown) formed in the wall 16 near to the flange 17 allow gas to pass from the space within the tube 11 to the space between the tube 11 and the chamber lining member 18.

A screened four-core cable 37 passes through the end-closure member 20 to the amplifier 19, two of the conductors of the cable serving to couple a DC source 38 to the amplifier 19, and the other two conductors serving to couple the output circuit of the amplifier to a frequency meter 39. The screen of the screened four-core cable 37 is electrically connected to the chamber 12 and to respective common-rail conductors of the amplifier 19 and the frequency meter 39.

In operation, gas flows from the inlet port 13 to the pipe 35 through a filter 40. Before leaving the chamber 12 by way of the outlet port 14, gas passes through a further filter 41. Each of the filters 40 and 41 comprises an externally screw-threaded body having a passage therethrough which houses a mass of sintered metal powder. The filter 40 is screw-threadedly engaged in one end of the pipe 35, and the filter 41 is screw-threadedly engaged in a tubular projection 42 integral with the chamber-lining member 18. Gas entering the space between the body 23 and the wall 16 from the tube 36 escapes from the said space both by way of the small holes in the wall 16 as mentioned hereinbefore and by way of a circular opening 43 in the end wall 44 of the tube 11 remote from the flange 17. The circular opening 43 is coaxial with the body 23 in order that gas may flow equally between the body 23 and the end wall 44 of the tube at all points of the gap between the end wall 44 and the body 23.

O-rings 45, 46, 47, 48 and 49 are included in the chamber 12 to provide gas tight seals. The O-rings 48 and 49 are retained within the end closure members 20 and 21 respectively by discs 50 and 51 respectively. The discs 50 and 51 are screw-threadedly engaged in the end closure members 20 and 21 respectively, and are provided with central apertures, the tubular projection 42 being located in the central aperture of the disc 51 and the tube 35 being located in the central aperture of the disc 50. The cable 37 passes through a further aperture in the disc 50.

The drive coil 27 and the pickup coil 28 are provided with respective composite cores 52 and 53. Each composite core comprises a cylindrical permanent magnet equipped with soft iron pole pieces, the length of the magnet being approximately one-seventh the length of each pole piece. The perpendicular relationship of the axes of the drive coil 27 and the pickup coil 28 provides a low degree of direct coupling between the drive coil 27 and the pickup coil 28.

In operation, natural bell-like vibrations of the tube 11 are excited and maintained by virtue of feedback from the pickup coil 28 to the drive coil 27 through the amplifier 19. The vibrations are initiated by mechanical noise transmitted to the tube 11 or by electrical noise occurring in the drive coil 27 when the amplifier is switched into action. The end wall 44 and the flange 17 are sufficiently thick for nodes to be present at the ends of the tube 11 during such vibrations. FIGS. 2 and 3 illustrates two forms of such vibrations. FIG. 2 showing the form of the vibrations having the fundamental frequency. The continuous lines indicate the undisturbed cross section of the cylindrical wall 16, the broken lines indicating extreme conditions of the wall 16 during natural bell-like vibrations in FIGS. 2 and 3. It will be realized that in practice, the natural bell-like vibrations may be a combination of the forms of vibration shown in FIGS. 2 and 3 and other such forms.

The predominant frequency of the natural bell-like vibrations of the tube 11 is measured by means of the electrical frequency meter 39, the frequency of the current supplied to the drive coil 27 being the same as the predominant frequency of the vibrations of the tube 11. The frequency meter 39 is a conventional electrical frequency meter adapted to cover the range of predominant frequencies anticipated for the operation of the density meter and can be calibrated to read directly in density units from a calibration graph prepared from frequencies obtained when the tube 11 is excited in contact with gases having standard densities.

The effect of the pressure of the gas on the predominant frequency of the vibrations of the tube 11 is negligible since the gas is applied both internally and externally to the tube 11. Pressure differences axially of the tube 11 associated with the flowing of the gas within the tube 11 and outside the tube 11 are arranged to be approximately the same magnitude so that substantially no pressure difference is set up across the cylindrical wall 16 and the end wall 44, in other words the differential pressure exerted on the region of the tube 11 into contact with which the gas is brought is maintained substantially constant at zero pressure. Thus the frequency of the natural bell-like vibrations of the tube 11 is dependent primarily upon the density of the gas flowing through the density meter. The effect of variation of the temperature of the tube 11 can be rendered small for useful ranges of working conditions by the use of a suitable material for the tube 11.

In a gas-densitometer of the type shown in FIG. 1, the cylindrical wall 16 can be made as thin as two-thousandths of an inch. The ferromagnetic alloy, of which the tube 11 is formed, is Ni-Span C 902.

Ni-span-C 902 is an iron-nickel-chromium alloy produced by the Huntingdon Alloy Products Division of the International Nickel Company, Incorporated, of Huntingdon, West Virginia and has the following limiting chemical composition

| Nickel (plus cobalt) | 41.0 to 43.50% |
|---|---|
| Chromium | 4.90 to 5.75% |
| Titanium | 2.20 to 2.75% |
| Aluminum | 0.30 to 0.80% |
| Carbon | 0.06 maximum % |
| Manganese | 0.08 maximum % |
| Silicon | 1.00 maximum % |
| Sulphur | 0.04 maximum % |
| Phosphorus | 0.04 maximum % |
| Iron | Remainder. |

Further details of the properties of Ni-Span-C 902 are given in Technical Bulletin T-31 of the Huntingdon Alloy Products Division.

The amplifier 19 is a conventional transistor amplifier encapsulated in thermoset synthetic resin such as Araldite 750/951 (Trade Mark) or a ceramic material and includes a low-pass filter having a cutoff frequency below the second harmonic of the highest natural bell-like vibration anticipated to arise in operation, the predominant frequency in the vibrations being in this embodiment the first harmonic, that is, the fundamental.

Another liquid density meter which includes a hollow body through which a liquid can be passed during operation is shown in FIG. 4, the hollow body being in the form of a cylindrical shell 76 cut from a single crystal of quartz, the longitudinal axis of the shell being at an angle of about 5° to the Z-axis, that is, the optical axis, of the crystal.

Each end of the shell 76 is secured in a massive metal port 77, each port 77 being electrically connected to a respective layer of metal 78 and 78' plated on to the outer curved surface of the shell 76. A third layer of metal 79, which comprises two metal plate regions 179 and 179' with an electrical connection 180 therebetween, is plated on to the inner surface of the shell 76 to form with the layers 78 and 78' an arrangement of conductive plates for piezoelectrically straining central cross sections of the shell 76 in such a manner that natural bell-like vibrations of the shell can be excited. The arrangement comprises the capacitive coupling of a Pierce oscillator, which includes an amplifier 80 the input and output circuits of which are connected to respective ones of the ports 77. Natural bell-like vibrations of the shell 76 are excited and maintained in operation by the Pierce oscillator. The output of the amplifier 80 is also connected to the frequency meter 39 which indicate the predominant frequency of the vibrations.

The thickness of the wall of the shell 76 is such that changes in the difference in pressure across the wall encountered in operation are negligible.

Other embodiments of the present invention can be constructed having means for exciting natural bell-like vibrations in a hollow body comprising, for example, magneto-strictive apparatus or a mechanical striking mechanism that excites damped vibrations which are allowed to die away, the hollow body being struck once for each frequency reading required.

Furthermore, embodiments can be constructed in which the means for exciting natural bell-like vibrations of the hollow body comprise a variable-frequency electrical oscillator having its output coupled to the hollow body. In such an embodiment the means for generating a signal representative of the predominant frequency of the vibration can comprise the variable-frequency electrical oscillator, which may be calibrated to read directly in density units. In operation, the frequency of the variable-frequency oscillator is varied until means for sensing the amplitude of the vibrations of the hollow body indicate a maximum in the amplitude, the frequency at which this occurs being the predominant frequency of the natural bell-like vibrations.

Although in the embodiments described with reference to the drawings natural bell-like vibrations are excited, further embodiments can be constructed in which other modes of natural vibration are excited such as natural transverse vibrations, natural longitudinal vibrations, and natural flexival vibrations. Furthermore, embodiments in accordance with the invention can be constructed in which a frequency other than the predominant frequency of the natural vibrations is measured, such frequency being by virtue of the construction and operation of embodiment rendered insensitive to variations in differential pressure.

For the purpose of determining the thickness of wall sufficient to render a frequency of the natural vibrations of a hollow body substantially insensitive to variations in differential pressure, use may be made of the equation $$f^2 = f_o^2 \times \frac{(1 + N_{p_o})}{\left(1 + \frac{D}{D_1}\right)\left(1 + \frac{D^1}{D_2}\right)}$$

where $f$ is the resonant frequency of the hollow body, $f_o$ is a constant, $p$ is the differential pressure taken to be positive when acting from the interior to the exterior of the hollow body, $p_o$ is a constant dependent upon the size, shape, and material forming the hollow body, $D$ is the density of the fluid within the hollow body acting on the wall, $D^1$ is the density of the fluid outside the hollow body acting on the wall, and $D_1$ and $D_2$ are constants dependent upon the dimensions material and shape of the hollow body.

The dependence of the constants $P_o$, $D_1$, $D_2$ on the thickness of the wall can be determined empirically.

Thus it is possible to determine the required thickness of a wall of an embodiment in which the fluid of which the density is to be measured is applied to the interior or to the exterior only of the hollow body, and the range of pressure over which a frequency of the hollow body is substantially insensitive to variations in the differential pressure.

I claim:

1. Apparatus for measuring the density of a fluid comprising an elongated hollow vibratory body formed of a piezoelectric material, said body having a continuous substantially cylindrical wall of a thickness sufficient to prevent differential pressure effects, means for placing the fluid in contact with said body wall, an amplifier means with an input and an output, an electrical coupling means electrically connected between said input and said output for exciting natural transverse vibrations of said body, said coupling means comprising capacitive coupling means including two pairs of spaced metal plates, said plates being in contact with said body wall with two of said plates being electrically interconnected, one remaining plate being connected to said input and the other remaining plate connected to said output, said output having a frequency representative of fluid density.

2. Apparatus as defined in claim 1 wherein each of said pairs of metal plates in said capacitive coupling includes an outer plate mounted on the exterior of said body wall and an inner plate mounted on the interior of said body wall in juxtaposed position to the outer plate.

3. Apparatus as defined in claim 1 wherein one outer plate is connected to the output of said amplifier and the other outer plate is connected to the input of said amplifier.

* * * * *